United States Patent
Lafe

(10) Patent No.: US 6,400,766 B1
(45) Date of Patent: Jun. 4, 2002

(54) METHOD AND APPARATUS FOR DIGITAL VIDEO COMPRESSION USING THREE-DIMENSIONAL CELLULAR AUTOMATA TRANSFORMS

(75) Inventor: Olurinde E. Lafe, Chesterland, OH (US)

(73) Assignee: QuikCAT.com, Inc., Mayfield Village, OH (US)

( * ) Notice: Subject to any disclaimer, the term of this patent is extended or adjusted under 35 U.S.C. 154(b) by 0 days.

(21) Appl. No.: 09/552,431

(22) Filed: Apr. 18, 2000

Related U.S. Application Data
(60) Provisional application No. 60/173,982, filed on Dec. 30, 1999.

(51) Int. Cl.$^7$ .................................................. H04B 1/66
(52) U.S. Cl. .................. 375/240.21; 382/254; 382/244; 382/240; 382/251
(58) Field of Search .................... 370/240.21; 348/239; 382/248, 254, 244, 240, 251, 263, 264, 232, 250; 380/43

(56) References Cited

U.S. PATENT DOCUMENTS

| | | | |
|---|---|---|---|
| 4,755,960 A | 7/1988 | Batson et al. ................. 364/715 |
| 4,999,705 A * | 3/1991 | Puri ........................ 348/412.1 |
| 5,126,962 A * | 6/1992 | Chiang ......................... 382/250 |
| 5,321,776 A | 6/1994 | Shapiro ......................... 382/56 |
| 5,365,589 A * | 11/1994 | Gutowitz ....................... 380/43 |
| 5,412,741 A | 5/1995 | Shapiro ........................ 382/232 |
| 5,422,963 A | 6/1995 | Chen et al. ................... 382/232 |
| 5,570,197 A | 10/1996 | Boon ........................... 386/46 |
| 5,611,038 A | 3/1997 | Shaw et al. .................. 395/806 |
| 5,675,424 A | 10/1997 | Park ........................... 358/426 |
| 5,677,956 A | 10/1997 | Lafe ............................ 380/28 |
| 5,727,084 A | 3/1998 | Pan et al. .................... 382/232 |
| 5,729,691 A | 3/1998 | Agarwal .................... 395/200.77 |
| 5,768,427 A | 6/1998 | Pan et al. .................... 382/232 |
| 5,819,215 A | 10/1998 | Dobson et al. ............. 704/230 |
| 5,838,377 A | 11/1998 | Greene ........................ 348/398 |
| 5,845,243 A | 12/1998 | Smart et al. ................. 704/230 |
| 5,859,788 A * | 1/1999 | Hou ........................ 364/725.01 |
| 5,880,856 A | 3/1999 | Ferriere ....................... 358/432 |
| 5,881,176 A | 3/1999 | Keith et al. .................. 382/248 |
| 6,124,887 A * | 9/2000 | Auffret et al. .............. 348/239 |
| 6,160,918 A * | 12/2000 | Pigeon ........................ 382/248 |
| 6,229,927 B1 * | 5/2001 | Schwartz .................... 382/248 |

OTHER PUBLICATIONS

Aggoun et al, A 3D Architecture for Compression of Integral 3D Images, 2000, IEEE, pp. 238–244.*

* cited by examiner

Primary Examiner—Chris Kelley
Assistant Examiner—Shawn S. An
(74) Attorney, Agent, or Firm—Michael A. Jaffe

(57) ABSTRACT

Digital video data is encoded by using the evolving states of cellular automata. The video data is subdivided into groups of three-dimensional "video cubes". The data is transformed via 3D filters derived from the cellular automata. The ensuing transform coefficients are encoded using a sub-band-based embedded stream technique that automatically transmits or stores the most important coefficients. Compression of the video cubes is achieved when the stream encoding/decoding is terminated after 1) a stipulated maximum bit budget is reached, or 2) when a predefined maximum error rate is attained. This invention teaches an encoding method for accelerating the transmission of video data through communications networks and storing the compressed data on digital storage media.

46 Claims, 8 Drawing Sheets

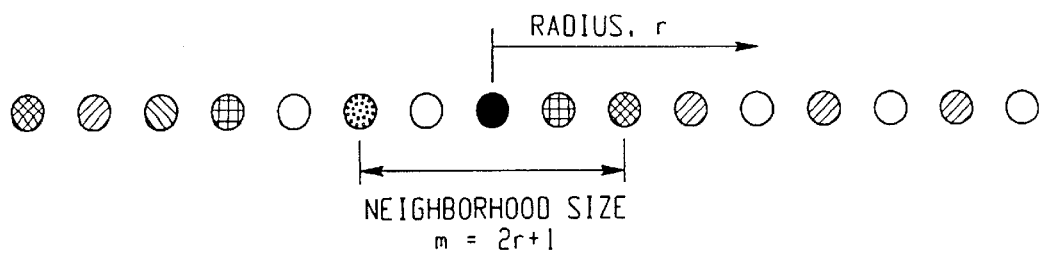
Fig. 1
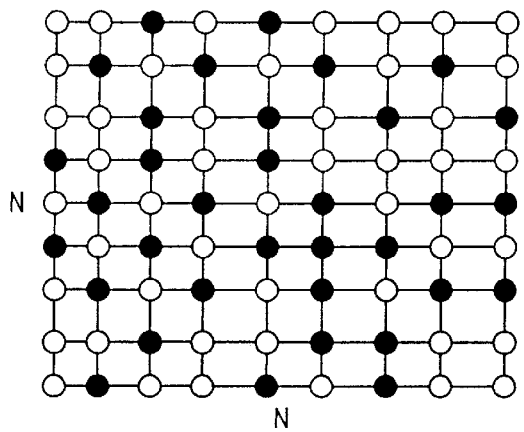
Fig. 2
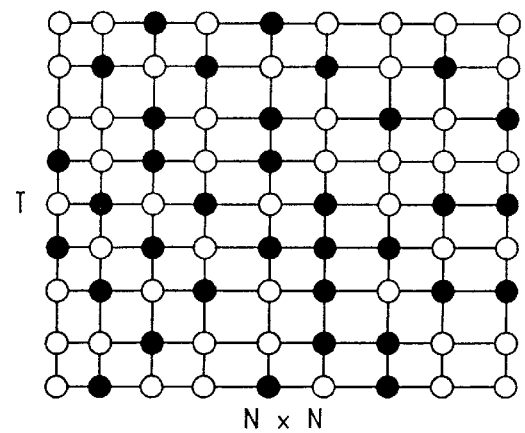
Fig. 3
Fig. 4

METHOD AND APPARATUS FOR DIGITAL VIDEO COMPRESSION USING THREE-DIMENSIONAL CELLULAR AUTOMATA TRANSFORMS

RELATED APPLICATIONS

The present application claims the benefit of U.S. Provisional Application No. 60/173,982 filed Dec. 30, 1999.

FIELD OF INVENTION

The present invention generally relates to the field of video data compression, and more particularly to a method and apparatus for video data compression which operates on dynamical systems, such as cellular automata (CA).

BACKGROUND OF THE INVENTION

At the most primitive level digital video is three-dimensional (3D) data consisting of the "flow" of two-dimensional images (i.e., "frames") over time (FIG. 11). Thirty frames per second (fps) is the standard rate considered to define a fairly good quality video. Eighteen fps will be acceptable for certain situations. High definition video demands rates on the order of 60 fps.

The challenge involved in compressing video data is daunting. Consider a video frame of 320×240 pixels. For a 24-bit color, each frame will has 3×320×240=1,843,200 bits of information. Assuming 30 fps, each second of the video contains 1,843,200×30=55,296,000 bits (or 6,912,000 bytes) of data. If this video were to be transmitted over the Plain Old Telephone System (POTS) line through a 56 kilobits per second (kps) modem then the compression required to receive the video in real time is 55,296,000/(56×1,024)= 964:1. Alternatively, to store one hour of this video uncompressed will require a storage space of 6,912,000×60×60 bytes=23 Gbytes. A digital video stream with 640×480 frames will require four times the compression or storage requirement outlined above. Therefore, the need for fast and effective compression is apparent.

The best approach for dealing with the bandwidth limitation and also reduce huge storage requirement is to compress the data. Since video is a conglomeration of individual picture frames, typical video compression methods are largely defined by: 1) the way the individual reference frames are encoded, and 2) the technique for relating/predicting intermediate frames together given the information about the reference frames. Some of the most popular techniques for compressing image data combine transform approaches (e.g. the Discrete Cosine Transform, DCT) with psycho-visual techniques. The current industry standard is the so-called JPEG (Joint Photographic Expert Group) format, which is based on DCT.

Some recent inventions (e.g., U.S. Pat. No. 5,881,176 to Keith et al) teach the use of the wavelet transform as the tool for image compression. The bit allocation schemes on the wavelet-based compression methods are generally based on the so-called embedded zero-tree concept taught by Shapiro (U.S. Pat. Nos. 5,321,776 and 5,412,741). Other image compression schemes that utilize wavelets as transform basis functions are described by Ferriere (U.S. Pat. No. 5,880,856), Smart et al. (U.S. Pat. No. 5,845,243), and Dobson et al (U.S. Pat. No. 5,819,215).

Prior patents that specifically address video compression include those of Greene (U.S. Pat. No. 5,838,377), which uses the wavelets approach; and Agarwal (U.S. Pat. No. 5,729,691) who taught the use of conglomeration of transforms (including DCT, Slaar and Haar transforms) for video compression.

In order to achieve a better compression/decompression of digital image data, the present invention makes use of a transform method that uses a dynamical system, such as cellular automata transforms (CAT). The evolving fields of cellular automata are used to generate "building blocks" for image data. The rules governing the evolution of the dynamical system can be adjusted to produce "building blocks" that satisfy the requirements of low-bit rate image compression process.

The concept of cellular automata transform (CAT) is taught by Lafe in U.S. Pat. No. 5,677,956, as an apparatus for encrypting and decrypting data. The present invention uses more complex dynamical systems that produce efficient "building blocks" for encoding video data. A special bit allocation scheme that also facilitates compressed data streaming is provided as an efficient means for encoding the quantized transform coefficients obtained after the cellular automata transform process.

SUMMARY OF THE INVENTION

According to the present invention there is provided a method of compressing digital video data which includes the steps of: (a) determining a multi-state dynamical rule set and an associated transform basis function, (b) receiving input image data, and (c) performing a forward transform using the transform basis function to obtain transform coefficients suitable for reconstructing the input video data.

In accordance with another aspect of the present invention there is provided a method of compressing video data which includes the steps of: (a) receiving a 3-D block of input video data, defined by directions k, l and m, the block of input video data comprised of a plurality of data frames; (b) determining a transform basis function having a size defined by $N_k$, $N_l$, and $N_m$; (c) selecting $N_m$ data frames to be compressed together; (d) dividing each data frame into $N_k \times N_l$ rectangles; and (e) performing a forward transform on a block of data defined by $N_k \times N_l \times N_m$, using the transform basis function, to obtain transform coefficients suitable for reconstructing the input video data.

An advantage of the present invention is the provision of a method and apparatus for digital video compression which provides improvements in the efficiency of digital media storage.

Another advantage of the present invention is the provision of a method and apparatus for digital video compression which provides faster data transmission through communication channels.

Still other advantages of the invention will become apparent to those skilled in the art upon a reading and understanding of the following detailed description, accompanying drawings and appended claims.

BRIEF DESCRIPTION OF DRAWINGS

The invention may take physical form in certain parts and arrangements of parts, a preferred embodiment and method of which will be described in detail in this specification and illustrated in the accompanying drawings which form a part hereof, and wherein:

FIG. 1 illustrates a one-dimensional multi-state dynamical system;

FIG. 2 illustrates the layout of a cellular automata lattice space for a Class I Scheme;

FIG. 3 illustrates the layout of a cellular automata lattice space for a Class II Scheme;

FIG. 4 illustrates a one-dimensional sub-band transform of a data sequence of length L;

DETAILED DESCRIPTION OF THE INVENTION

It should be appreciated that while a preferred embodiment of the present invention will be described with reference to cellular automata as the dynamical system, other dynamical systems are also suitable for use in connection with the present invention, such as neural networks and systolic arrays.

In summary, the present invention teaches the use of transform basis functions (also referred to herein as "filters") to transform video data for the purpose of more efficient storage on digital media or faster transmission through communications channels. A transform basis function is comprised of a plurality of "building blocks," also referred to herein as "elements" or "transform bases." According to a preferred embodiment of the a present invention, the elements of the transform basis function are obtained from the evolving field of cellular automata. The rules of evolution are selected to favor those that result in orthogonal transform basis functions. A special psycho-visual model is utilized to quantize the ensuing transform coefficients. The quantize transform coefficients are preferably stored/transmitted using a hybrid run-length-based/Huffman/embedded stream coder. The encoding technique of the present invention allows video data to be streamed continuously across communications networks.

Figure 8:
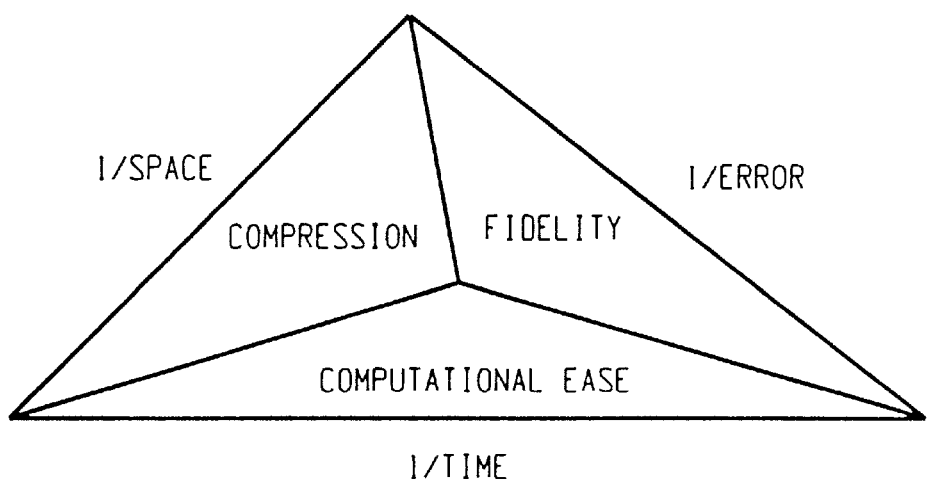
FIG. 8 illustrates interrelated factors that influence the compression process.

Referring now to the drawings wherein the showings are for the purposes of illustrating a preferred embodiment of the invention only and not for purposes of limiting same, FIG. 8 illustrates some of the costs involved in data compression techniques. In general, data compression schemes seek to remove or minimize the inherent redundancy within a data string. In general, efforts at compressing any data invariably come at a price. In this regard, compression costs pertains to three interrelated factors:

(a) Compression ratio. The data storage space and/or data transmission time vary inversely with the compression.

(b) Computational time. How many mathematical operations are involved? Adaptive codes, for example, will generally provide better compression ratios and/or improved fidelity. The cost is the time (or computational effort) required to attain the improvement.

(c) Encoding/Decoding fidelity. Is there any loss of information during the encoding/decoding phases?

Obviously in situations where the compression process requires a perfect reconstruction of the original data (i.e., lossless encoding) the error size must be zero. In that case, FIG. 8 degenerates into a dual-factor relationship in which more compression is typically achieved at the expense of computational ease. A classic example is the family of adaptive encoders.

Data that is perceived (e.g., photographs, audio, and video) can often be compressed with some degree of loss in the reconstructed data. Greater compression is achieved at the expense of signal fidelity. In this case a successful encoding strategy will produce an error profile that cannot be perceived by the human eye (digital images and video) or ear (digital audio). Perceptual coding becomes a key and integral part of the encoding process.

Cellular Automata (CA) are dynamical systems in which space and time are discrete. The cells are arranged in the form of a regular lattice structure and must each have a finite number of states. These states are updated synchronously according to a specified local rule of interaction. For example, a simple 2-state 1-dimensional cellular automaton will consist of a line of cells/sites, each of which can take value 0 or 1. Using a specified rule (usually deterministic), the values are updated synchronously in discrete time steps for all cells. With a K-state automaton, each cell can take any of the integer values between 0 and K−1. In general, the rule governing the evolution of the cellular automaton will encompass m sites up to a finite distance r away. Thus, the cellular automaton is referred to as a K-state, m-site neighborhood CA. FIG. 1 illustrates a multi-state one-dimensional cellular automaton.

It will be appreciated that the number of dynamical system rules available for a given compression problem can be astronomical even for a modest lattice space, neighborhood size, and CA state. Therefore, in order to develop practical applications a system must be developed for addressing the pertinent CA rules. Consider, for an example, a K-state N-node cellular automaton with m=2r+1 points per neighborhood. Hence in each neighborhood, if a numbering system is chosen that is localized to each neighborhood, the following represents the states of the cells at time t: $a_{i,t}$ (i=0,1,2,3, ... m−1). The rule of evolution of a cellular automaton is defined by using a vector of integers $W_j$ (j=0,1,2,3, ..., $2^m$) such that $$a_{(r)(t+1)} = \left( \sum_{j=0}^{2^m-2} W_j \alpha_j + W_{2^m-1} \right)^{W_{2^m}} \mod K \quad (1)$$

where $0 \leq W_j < K$ and $\alpha_j$ are made up of the permutations (and products) of the states of the cells in the neighborhood. To illustrate these permutations consider a 3-neighborhood one-dimensional CA. Since m=3, there are $2^3 = 8$ integer W values. The states of the cells are (from left-to-right) $a_{0,t}, a_{1,t}, a_{2,t}$ at time t. The state of the middle cell at time t+1 is:

$$a_{1(t+1)} = (W_0 a_{0,t} + W_1 a_{1,t} + W_2 a_{2,t} + W_3 a_{0,t} a_{1,t} + W_4 a_{1,t} a_{2,t} + W_5 a_{2,t} a_{0,t} + W_6 a_{0,t} a_{1,t} a_{2,t} + W_7)^{W_8} \mod K \quad (2)$$

Hence, each set of $W_j$ results in a given rule of evolution. The chief advantage of the above rule-numbering scheme is that the number of integers is a function of the neighborhood size; it is independent of the maximum state, K, and the shape/size of the lattice.

Given a data f in a D dimensional space measured by the independent discrete variable i, we seek a transformation in the form:

$$f_i = \sum_k c_k A_{ik} \qquad (3)$$

where $A_{ik}$ are transform bases, k is a vector (defined in D) of non-negative integers, while $c_k$ are referred to as "transform coefficients" or "weights" whose values are obtained from the inverse transform basis function:

$$c_k = \sum_k f_i B_{ik} \qquad (4)$$

in which the transform basis function B is the inverse of transform basis function A.

When the transform bases $A_{ik}$ are orthogonal, the number of transform coefficients is equal to that in the original data f. Furthermore, orthogonal transformation offers considerable simplicity in the calculation of the transform coefficients. From the point-of-view of general digital signal processing applications, orthogonal transforms are preferable on account of their computational efficiency and elegance. The forward and inverse transform basis functions A and B are generated from the evolving states a of the cellular automata. Below is a general description of how these transform basis functions are generated.

A given CA transform basis function is characterized or classified by one (or a combination) of the following features:

(a) The method used in calculating the bases from the evolving states of cellular automata.

(b) The orthogonality or non-orthogonality of the transform basis functions.

(c) The method used in calculating the transform coefficients (orthogonal transformation is generally the easiest).

The simplest transform basis functions are those with transform coefficients (1,−1) and are usually derived from dual-state cellular automata. Some transform basis functions are generated from the instantaneous point density of the evolving field of the cellular automata. Other transform basis functions are generated from a multiple-cell-averaged density of the evolving automata.

One-dimensional (D=1) cellular spaces offer the simplest environment for generating CA transform bases. They offer several advantages, including:

(a) Manageable alphabet base for small neighborhood size, m, and maximum state K. This is a strong advantage in data compression applications.

(b) The possibility of generating higher-dimensional bases from combinations of the one-dimensional.

(c) The excellent knowledge base of one-dimensional cellular automata.

In a 1D space the goal is to generate the transform basis function $$A = A_{ik} \quad i, k = 0, 1, 2, \ldots N-1$$

from a field of L cells evolved for T time steps. Therefore, consider the data sequence $f_i (i=0,1,2, \ldots N-1)$, where:

$$f_i = \sum_{k=0}^{N-1} c_k A_{ik} \quad i, k = 0, 1, 2, \ldots N-1 \qquad (5)$$

in which $c_k$ are the transform coefficients. There are infinite ways by which $A_{ik}$ can be expressed as a function of the evolving field of the cellular automata $a \equiv a_{it}$, (i=0, 1, 2, ... L−1; t=0, 1, 2, ... T−1). A few of these are enumerated below.

Referring now to FIG. 2, the simplest way of generating the bases is to evolve N cells over N time steps, where L=T=N. This results in $N^2$ discrete states from which the transform bases ("building blocks") $A_{ik}$ can be derived. This is referred to as the Class I Scheme. It should be noted that the bottom base states shown in FIG. 2 form the initial configuration of the cellular automata.

Referring now to FIG. 3, there is shown a more universal approach, referred to as the Class II Scheme, which selects $L=N^2$ (i.e., the number of elements of the transform basis function to be derived) and makes the evolution time T independent of the number of elements forming the transform basis function. Thus, $N^2$ cells are evolved over T time steps. One major advantage of the latter approach is the flexibility to tie the precision of the elements of the transform basis function to the evolution time T. It should be noted that the bottom base states (with $N^2$ cells) shown in FIG. 3 form the initial configuration of the cellular automata.

Class I Scheme:

When the N cells are evolved over N times steps, $N^2$ integers are obtained:

$$a \equiv a_{it}, (i,t=0, 1, 2, \ldots N-1)$$

which are the states of the cellular automata including the initial configuration. A few transform basis function types belonging to this group include:

$$A_{ik} = \alpha + \beta a_{ik} \qquad \text{Type 1}$$

where $a_{ik}$ is the state of the CA at the node i at time t=k while $\alpha$ and $\beta$ are constants.

$$A_{ik} = \alpha + \beta a_{ik} a_{ki} \qquad \text{Type 2}$$

Class II Scheme:

Two types of transform basis functions are showcased under this scheme:

$$A_{ik} = \alpha + \beta \sum_{t=0}^{T-1} a_{(k+iN)(T-1-t)} / K^t \qquad \text{Type 1}$$

in which K is the maximum state of the automaton.

$$A_{ik} = \sum_{t=0}^{T-1} \{a_{(k+iN)(T-1-t)} - \beta\} \qquad \text{Type 2}$$

In most applications it is desirable to have transform basis functions that are orthogonal. Accordingly, the transform bases $A_{ik}$ should satisfy:

$$\sum_{i=0}^{N-1} A_{ik}A_{il} = \begin{cases} \lambda_k & k = l \\ 0 & k \ne l \end{cases} \qquad (6)$$

where $\lambda_k$ (k=0,1, ... N−1) are coefficients. The transform coefficients are easily computed as:

$$c_k = \frac{1}{\lambda_k}\sum_{i=0}^{N-1} f_i A_{ik} \qquad (7)$$

That is, the inverse transform bases are:

$$B_{ik} = \frac{A_{ik}}{\lambda_k} \qquad (8)$$

A limited set of orthogonal CA transform bases are symmetric: $A_{ik}=A_{ki}$. The symmetry property can be exploited in accelerating the CA transform process.

It should be appreciated that the transform basis functions calculated from the CA states will generally not be orthogonal. There are simple normalization/scaling schemes, well known to those skilled in the art, that can be utilized to make these orthogonal and also satisfy other conditions (e.g., smoothness of reconstructed data) that may be required for a given problem.

Figure 5A:
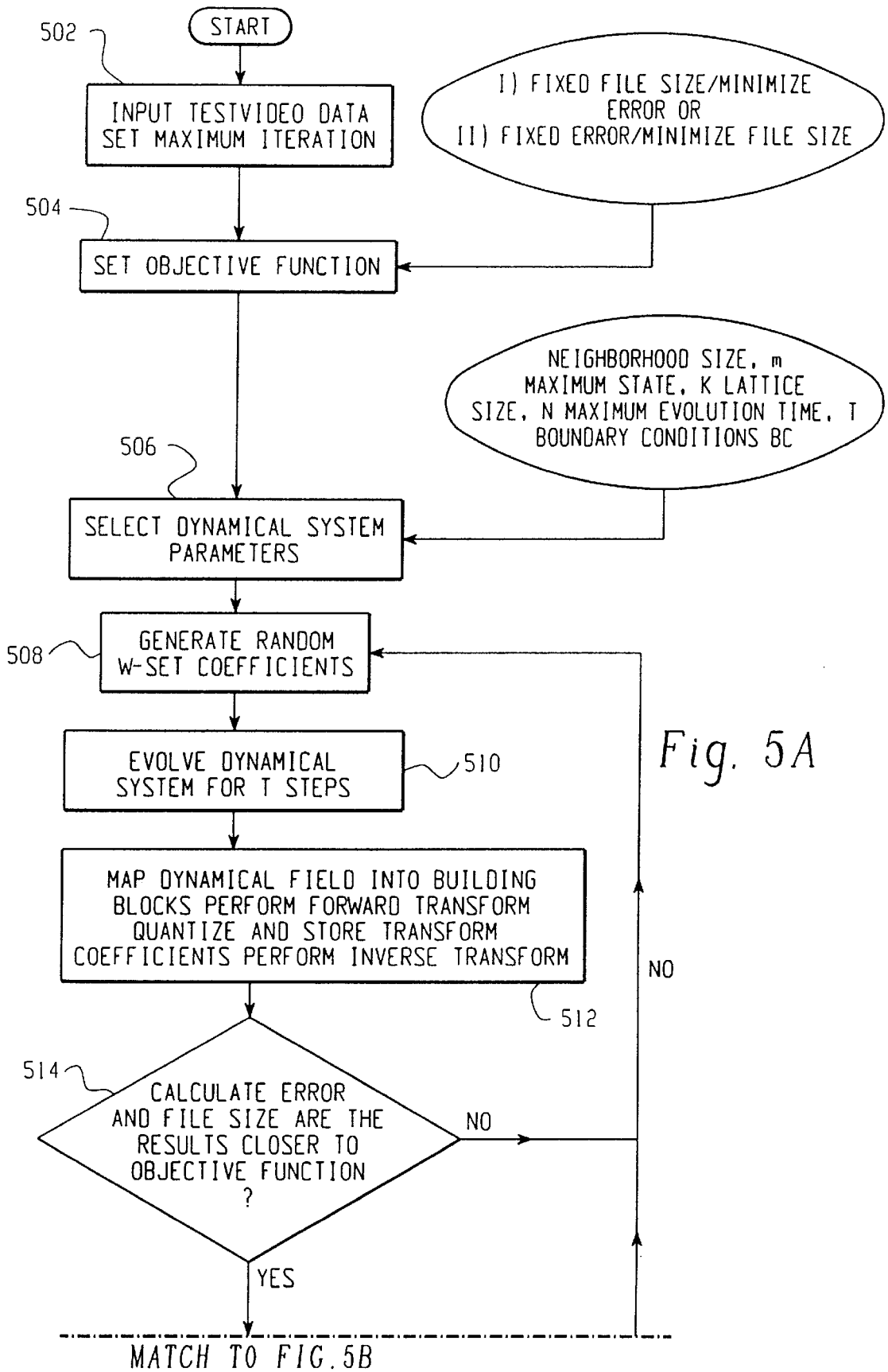
FIG. 5 is a flow diagram illustrating the steps involved in generating efficient image building blocks, according to a preferred embodiment of the present invention.
Figure 5B:
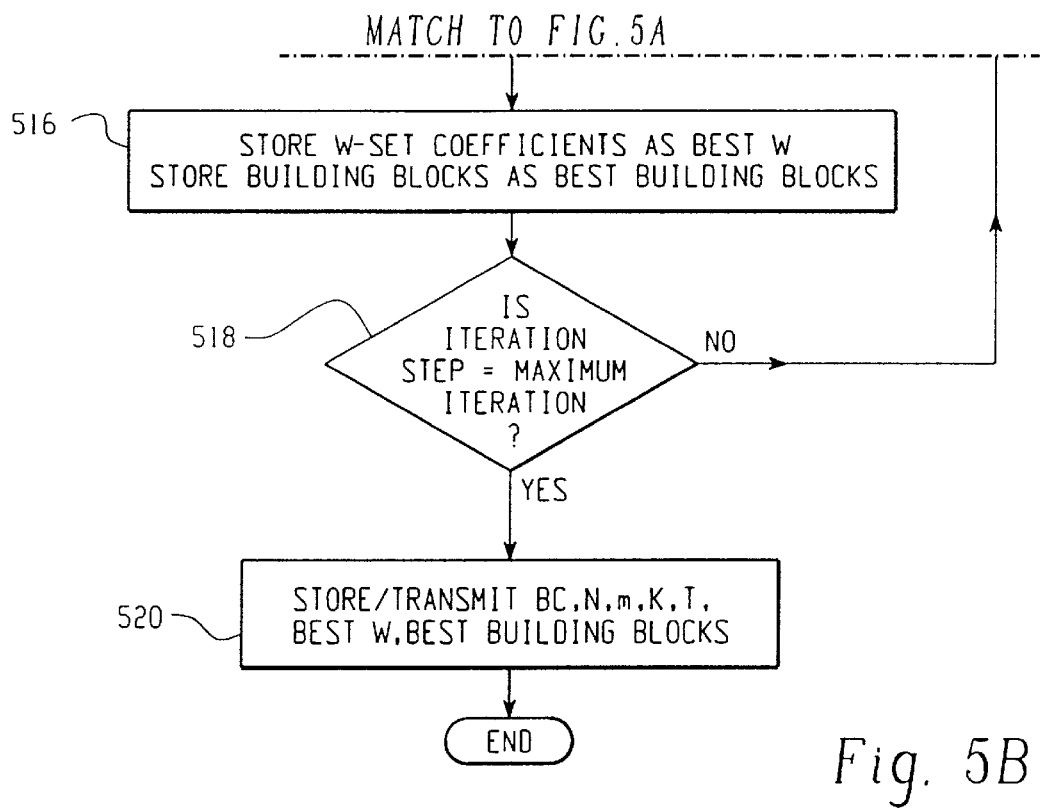

Referring now to FIG. 5, there is shown a flow chart illustrating the steps involved in generating an efficient transform basis function (comprised of "building blocks"), according to a preferred embodiment of the present invention. At step 502, TestVideo data is input into a dynamical system as the initial configuration of the automaton, and a maximum iteration is selected. Next, an objective function is determined, namely fixed file size/minimize error or fixed error/minimize file size (step 504). At steps 506 and 508, parameters of a dynamical system rule set (also referred to herein as "gateway keys") are selected. Typical rule set parameters include CA rule of interaction, maximum number of states per cell, number of cells per neighborhood, number of cells in the lattice, initial configuration of the cells, boundary configuration, geometric structure of the CA space (e.g., one-dimensional, square and hexagonal), dimensionality of the CA space, type of the CA transform (e.g., standard orthogonal, progressive orthogonal, non-orthogonal and self-generating), and type of the CA transform basis functions. For purposes of illustrating a preferred embodiment of the present invention, the rule set includes:

a) Size, m, of the neighborhood (e.g., one-divisional, square and hexagonal).
b) Maximum state K of the dynamical system.
c) The length N of the cellular automaton lattice space ("lattice size").
d) The maximum number of time steps T, for evolving the dynamical system.
e) Boundary conditions (BC) to be imposed. It will be appreciated that the dynamical system is a finite system, and therefore has extremities (i.e., end points). Thus, the nodes of the dynamical system in proximity to the boundaries must be dealt with. One approach is to create artificial neighbors for the "end point" nodes, and impose a state thereupon. Another common approach is to apply cyclic conditions that are imposed on both "end point" boundaries. Accordingly, the last data point is an immediate neighbor of the first. In many cases, the boundary conditions are fixed. Those skilled in the art will understand other suitable variations of the boundary conditions.
f) W-set coefficients $W_j$ (j=0,1,2, ... $2^m$) for evolving the automaton.

The dynamical system is then evolved for T time steps in accordance with the rule set parameters (step 510). The resulting dynamical field is mapped into the transform bases (i.e., "building blocks"), a forward transform is performed to obtain transform coefficients. The resulting transform coefficients are quantized to eliminate insignificant transform coefficients (and/or to scale transform coefficients), and the quantized transform coefficients are stored. Then, an inverse transform is performed to reconstruct the original test data (using the transform bases and transform coefficients) in a decoding process (step 512). The error size and file size are calculated to determine whether the resulting error size and file size are closer to the selected objective function than any previously obtained results (step 514). If not, then new W-set coefficients are selected. Alternatively, one or more of the other dynamical system parameters may be modified in addition to, or instead of, the W-set coefficients (return to step 508). If the resulting error size and file size are closer to the selected objective function than any previously obtained results, then store the coefficient set W as BestW and store the transform bases as Best Building Blocks (step 516). Continue with steps 508–518 until the number of iterations exceeds the selected maximum iteration (step 518). Thereafter, store and/or transmit N, m, K, T, BC and BestW, and Best Building Blocks (step 520). One or more of these values will then be used to compress/decompress actual video data, as will be described in detail below.

It should be appreciated that the initial configuration of the dynamical system, or the resulting dynamical field (after evolution for T time steps) may be stored/transmitted instead of the Best Building Blocks (i.e., transform bases). This may be preferred where use of storage space is to be minimized. In this case, further processing will be necessary in the encoding process to derive the building blocks (i.e., transform bases).

It should be appreciated that the CA filter (i.e., transform basis function) can be applied to input data in a non-overlapping or overlapping manner, when deriving the transform coefficients. The tacit assumption in the above derivations is that the CA filters are applied in a non-overlapping manner. In this regard, the input data is divided into segments, where none of the segments overlap. Hence, given a data, f, of length L, the filter A of size N×N is applied in the form:

$$f_i = \sum_{k=0}^{N-1} c_{kj} A_{(i \bmod N)k} \qquad (9)$$

where i=0,1,2, ... L−1 and j=0,1,2, ... (L/N)−1 is a counter for the non-overlapping segments. The transform coefficients for points belonging to a particular segment are obtained solely from data points belonging to that segment.

As indicated above, CA filters can also be evolved as overlapping filters. In this case, if l=N−N, is the overlap, then the transform equation will be in the form:

$$f_i = \sum_{k=0}^{N-1} c_{kj} A_{(i \bmod N_l)k} \qquad (10)$$

where i=0,1,2, ... L−1 and j=0,1,2, ... (L/$N_l$)−1 is the counter for overlapping segments. The condition at the end of the segment when i>L−N is handled by either zero padding or the usual assumption that the data is cyclic. Overlapped filters allow the natural connectivity that exists in a given data to be preserved through the transform process. Overlapping filters generally produce smooth reconstructed signals even after a heavy decimation of a large number of the transform coefficients. This property is important in the compression of digital images, audio and video signals.

It should be understood that given a data sequence $f_i$, a CA transform techniques seek to represent the data in the form:

$$f_i = \sum_k c_k A_{ik} \qquad (11)$$

in which c are transform coefficients, while $A_{ik}$ are the transform bases. The basic strategy for compressing data using CA is:

(a) Start with a set of CA "gateway keys" which produce transform basis functions A and its inverse B.

(b) Calculate the transform coefficients.

(c) For lossy encoding quantize the transform coefficients. In this approach he search is for CA bases that will maximize the number of negligible transform coefficients. The energy of the transform will be concentrated on the few of the retained transform coefficients. Ideally there will be a different set of CA gateway keys for different parts of a data file. There is a threshold point at which the overhead involved in keeping track of different gateway keys far exceeds the benefit gained in greater compression or encoding fidelity. In general, it is sufficient to "initialize" the encoding by searching for the one set of gateway keys with overall desirable properties: e.g., orthogonality, maximal number of negligible transform coefficients and predictable distribution of transform coefficients for optimal bit assignment. This approach is preferred in most CA data compression schemes. The encoding parameters include the gateway keys and the CA transform coefficients.

Figure 6:
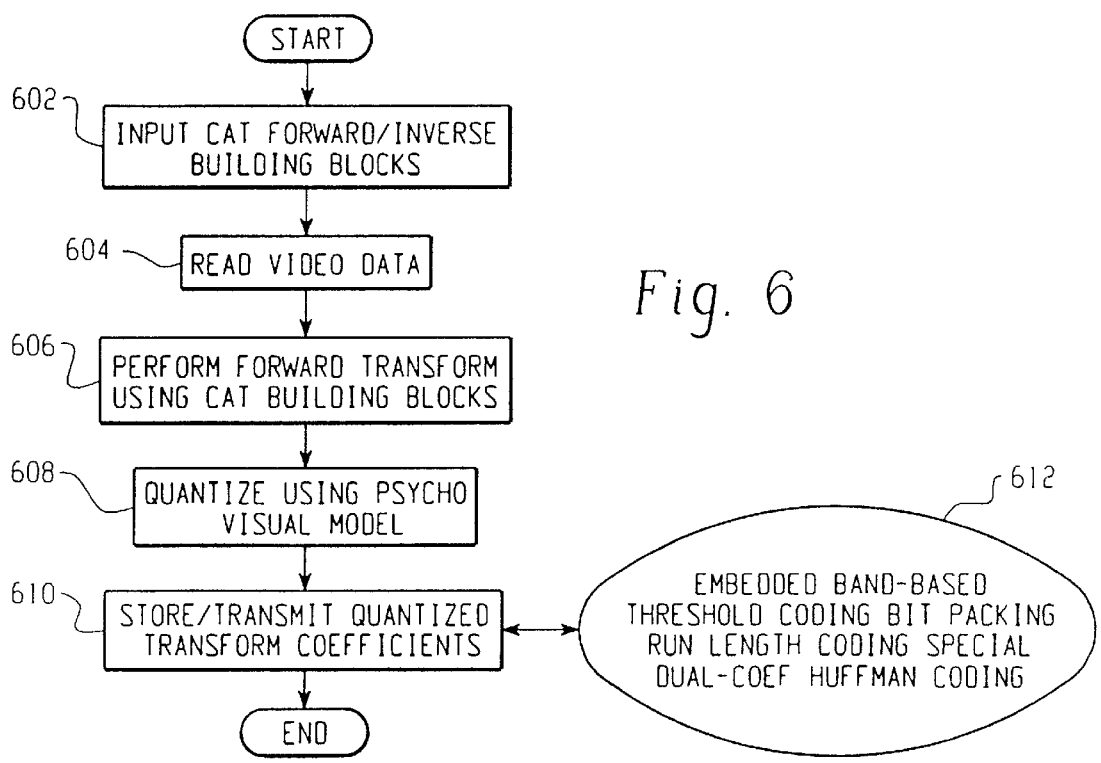
FIG. 6 is a flow diagram illustrating the encoding, quantization, and embedded stream processes, according to a preferred embodiment of the present invention.

Referring now to FIG. 6, a summary of the process for encoding input image data will be described. The building blocks comprising a transform basis function are received (step 602). These building blocks are determined in accordance with the procedure described in connection with FIG. 5. Image data to be compressed is input (step 604). Using the transform bases, a forward transform (as described above) is performed to obtain transform coefficients (step 606). It should be appreciated that this step may optionally include performing a "sub-band" forward transform, as will be explained below. As indicated above, given a data sequence $f_i$, the CA transform techniques of the present invention seek to represent the data in the form:

$$f_i = \sum_k c_k A_{ik} \qquad (12)$$

in which CA are transform coefficients, and $A_{ik}$ are the transform bases. Likewise, the transform coefficients are computed as:

$$c_k = \frac{1}{\lambda_k} \sum_{i=0}^{N-1} f_i A_{ik} \qquad (13)$$

Therefore, $c_k$ is determined directly from the building blocks obtained in the procedure described in connection with FIG. 5, or by first deriving the building blocks from a set of CA "gateway keys" or rule set parameters which are used to derive transform basis function A and its inverse B.

At step 608, the transform coefficients are quantized (e.g., using a Psycho Visual model). In this regard, for lossy encoding, the transform coefficients are quantized to discard negligible transform coefficients. In this approach the search is for a CA transform basis function that will maximize the number of negligible transform coefficients. The energy of the transform will be concentrated on a few of the retained transform coefficients.

Ideally, there will be a different set of values for the CA gateway keys for different parts of a data file. There is a threshold point at which the overhead involved in keeping track of different values for the CA gateway keys far exceeds the benefit gained in greater compression or encoding fidelity. In general, it is sufficient to "initialize" the encoding by searching for the one set of gateway keys with preferred overall properties: e.g., orthogonality, maximal number of negligible transform coefficients and predictable distribution of transform coefficients for optimal bit assignment. This approach is the one normally followed in most CA data compression schemes.

Continuing to step 610, the quantized transform coefficients are stored and/or transmitted. During storage/transmission, the quantized transform coefficients are preferably coded (step 612). In this regard, a coding scheme, such as embedded band-based threshold coding, bit packing, run length coding and/or special dual-coefficient Huffman coding is employed. Embedded band-based coding will be described in further detail below. The quantized transform coefficients form the compressed image data that is transmitted/stored.

It should be appreciated that steps 608, 610, and 612 may be collectively referred to as the "quantizing" steps of the foregoing process, and may occur nearly simultaneously.

Figure 7:
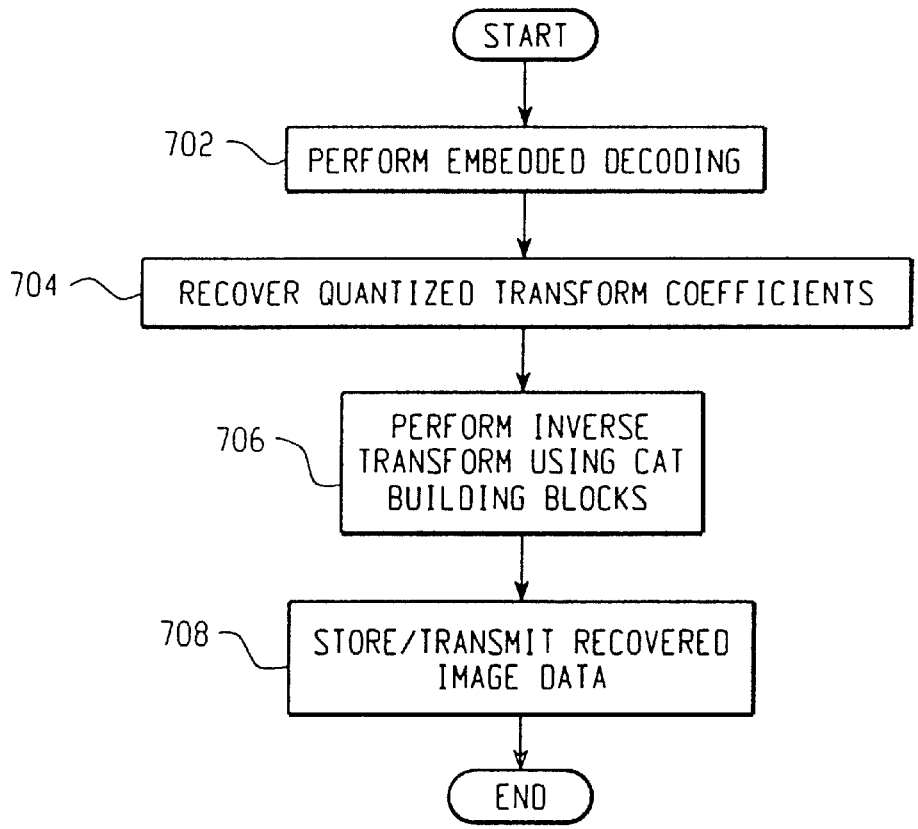
FIG. 7 is a flow diagram illustrating a decoding process, according to a preferred embodiment of the present invention.

The quantized transform coefficients are transmitted to a receiving system which has the appropriate building blocks, or has the appropriate information to derive the building blocks. Accordingly, the receiving device uses the transfer function and received quantized transform coefficients to recreate the original video data. Referring now to FIG. 7, there is shown a summary of the process for decoding the compressed video data. First, coded transform coefficients are decoded (step 702), e.g., in accordance with an embedded decoding process (step 702) to recover the original quantized transform coefficients (step 704). An inverse transform (equation 3) is performed using the appropriate transform function basis and the quantized transform coefficients (step 706). Accordingly, the image data is recovered and stored and/or transmitted (step 708). It should be appreciated that a "sub-band" inverse transform may be optionally performed at step 706, if a "sub-band" transform was performed during the encoding process described above.

The existence of trillions of transform basis functions and CA gateway keys mandates different strategies for different data encoding tasks. For each task a decision must be made as to how many different CA transform basis functions will be used. An evaluation must also be made of the cost associated with each decision in terms of computational cost, encoding/decoding time and fidelity. The three major schemes are the following:

(1) Single CA Transform Basis Function for Entire Data File: Each data block is encoded and decoded using the same CA transform basis functions. The advantage is that the gateway keys for the CA can be embedded in the CA coder/decoder, not in the compressed file. This is the best approach for tasks where speed is of the essence. The cost is the inability to fully exploit the main strength of CA-adaptability. This is a symmetric process, since the encoding and decoding will take approximately the same amount of time. The single-base-per file circumvents the need to design different quantization strategies for different parts of the data. The same CA transform basis function can even be used for several data files just as, say, the discrete cosine transform is utilized for a variety of image compression tasks.

(2) Single CA Transform Basis Function for Select Regions of Data File: Entire groups of data blocks are encoded with the same CA transform basis functions. While there is some sacrifice in time as a result of generating different CA transform bases for different regions, the number of gateway keys can be kept small; at least much smaller than the number of data blocks. This approach takes some advantage of the adaptive strength of CA encoding. The compression ratio and encoding fidelity will be much better than in (1). The encoding time will be slightly more than the decoding time. The number of different transform basis functions used will dictate the degree of asymmetry.

(3) One CA Transform Basis Function per Data Block: This approach is excellent in tasks where massive compression is the primary goal. The time it takes to search for the best CA transform basis function for each data block makes this most suitable for off-line asymmetric encoding tasks. An example is the publication of data on CD-ROMs where the encoded file will be read many times, but the compression is done once. We can then expend as much computational resources and time as we can get searching for the best CA transform basis functions for each block of the data file. The multiple base approach fully exploits the adaptive strength of CA transform basis functions.

The following discussion focuses on scheme (1), where the same set of CA gateway keys is used to encode the entire file. Once an optimal set of CA gateway keys has been selected for a test data, the same set can be used routinely to encode other data. The entropy of the transform coefficients is:

$$E = -\sum_i \phi_i \log_2(\phi_i) \quad (14)$$

where $\phi_i$ is the probability that a transform coefficient is of magnitude i. To compute $\phi_i$ the number of times the transform coefficients attain the value i (i.e., the frequency of i) is calculated. The resulting value is divided by the sum of all frequencies to obtain the pertinent probability. The goal is to find CA gateway keys that will result in the minimization of the entropy of the transform coefficients.

It should be understood that the quantization strategy is a function of how the data will be perceived. For digital images and video, low frequencies are given a higher priority than to high frequencies because of the way the human eye perceives visual information. For digital audio both low and high frequencies are important and the transform coefficient decimation will be guided by a psycho-acoustics-based profile.

Referring now to FIG. 4, one-dimensional sub-band coding will be described in detail. Sub-band coding is a characteristic of a large class of cellular automata transforms. Sub-band coding, which is also a feature of many existing transform techniques (e.g., wavelets), allows a signal to be decomposed into both low and high frequency components. It provides a tool for conducting the multi-resolution analysis of a data sequence.

For example, consider a one-dimensional data sequence, $f_i$, of length $L=2^n$, where n is an integer. FIG. 4 shows a one-dimensional sub-band transform of a data sequence of length L. The data is transformed by selecting M segments of the data at a time. The resulting transform coefficients are sorted into two groups, namely, the transform coefficients in the even locations (which constitute the low frequencies in the data) fall into one group, and the transform coefficients in the odd locations fall into a second group. It should be appreciated that for some CAT transform basis functions the location of the low and high frequency components are reversed. In such cases the terms odd and even as used below, are interchanged. The "even" group is further transformed (i.e., the "even" group of transform coefficients become the new input data to the transform) and the resulting $2^{n-1}$ transform coefficients are sorted into two groups of even and odd located values. The odd group is added to the odd group in the first stage; and the even group is again transformed. This process continues until the residual odd and even group is of size N/2. The N/2 transform coefficients belonging to the odd group is added to the set of all odd-located transform coefficients, while the last N/2 even-located group transform coefficients form the transform coefficients at the coarsest level. This last group is equivalent to the lowest CAT frequencies of the signal. At the end of this hierarchical process we actually end up with $L=2^n$ transform coefficients. Therefore, in FIG. 4, at the finest level the transform coefficients are grouped into two equal low (l) and high (h) frequencies. The low frequencies are further transformed and regrouped into high-low and low-low frequencies each of size L/4.

To recover the original data the process is reversed: we start from the N/2 low frequency transform coefficients and N/2 high frequency transform coefficients to form N transform coefficients; arrange this alternately in their even and odd locations; and the resulting N transform coefficients are reverse transformed. The resulting N transform coefficients form the even parts of the next 2N transform coefficients while the transform coefficients stored in the odd group form the odd portion. This process is continued until the original L data points are recovered. For overlapping filters, the filter size N above should be replaced with $N_l=N-l$, where l is the overlap.

It should be appreciated that a large class of transform basis functions derived from the evolving field of cellular automata naturally possesses the sub-band transform character. In some others the sub-band character is imposed by re-scaling the natural transform basis functions.

One of the immediate consequences of sub-band coding is the possibility of imposing a degree of smoothness on the associated transform basis functions. A sub-band coder segments the data into two parts: low and high frequencies. If an infinitely smooth function is transformed using a sub-band transform basis function, all the high frequency transform coefficients should vanish. In reality we can only obtain this condition up to a specified degree. For example, a polynomial function, $f(x)=x^n$, has an n-th order smoothness because it is differentiable n times. Therefore, for the transform bases $A_{ik}$ to be of n-order smoothness, we must demand that all the high frequency transform coefficients must vanish when the input data is up to an n-th order polynomial. That is, with $f(x)=f(i)=i^m$, we must have:

$$c_k = \sum_{i=0}^{N-1} i^m A_{ik} = 0 \quad (15)$$

In theory, the rules of evolution of the CA, and the initial configuration can be selected such that the above conditions are satisfied. In practice, the above conditions can be obtained for a large class of CA rules by re-scaling of the transform bases.

The following one-dimensional orthogonal non-overlapping transform basis functions have been generated from a 16-cell 32-state cellular automaton. The filters are obtained using Type 1 Scheme II. The CA is evolved through 8 time steps. The properties are summarized in Table 1.

Initial Configuration: 9 13 19 13 7 20 9 29 28 29 25 22 22 3 3 18

Kilo W-set Coefficients: 0 13 27 19 26 25 17 5 14 1

TABLE 1

Non-overlapping CAT filters

| | k → | | | |
|---|---|---|---|---|
| i↓ | 0 | 1 | 2 | 3 |
| 0 | 0.82827627065884399 | 0.5110409855842590 | 0.1938057541847229 | −0.1234294921159744 |
| 1 | 0.54769790117257690 | −0.7263893485069275 | −0.1903149634599686 | 0.3690064251422882 |
| 2 | −0.1181457293676376 | 0.1970712691545487 | 0.5122883319854736 | 0.8275054097175598 |
| 3 | −0.00519812918513775 | 0.4151608347892761 | −0.8147270679473877 | 0.4047644436359406 |

Multi-dimensional, non-overlapping filters are easy to obtain by using canonical products of the orthogonal one-dimensional filters. Such products are not automatically derivable in the case of overlapping filters.

The following two-dimensional overlapping transform basis functions have been generated from a 16-cell 8-state cellular automaton using the Type 2 of Scheme II. The properties are summarized in Table 2, set forth below Initial Configuration: 4 6 4 1 0 1 6 1 2 7 5 3 5 1 0 5
W-set Coefficients: 6 7 5 3 4 4 7 0 1

The CA has been evolved over 8 time steps. The following scaled transform coefficients are obtained from the states of the cellular automata evolved by using the above rule.

TABLE 2

Forward 2D Overlapping CAT Filters

| 1 + k | i → | | | |
|---|---|---|---|---|
| ↓ | 0 | 1 | 2 | 3 |
| 0 | 0.0000000000000000 | 0.0000000000000000 | 0.0000000000000000 | 0.0000000000000000 |
| 1 | 0.0000000000000000 | 0.0000000000000000 | 0.0000000000000000 | 0.0000000000000000 |
| 2 | 0.0000000000000000 | 0.0000000000000000 | 0.0000000000000000 | 0.0000000000000000 |
| 3 | 0.0000000000000000 | 0.0000000000000000 | 0.0000000000000000 | 0.0000000000000000 |
| 4 | 0.0000000000000000 | 0.0000000000000000 | 0.0000000000000000 | 0.0000000000000000 |
| 5 | 0.8333333730697632 | −0.3726780116558075 | −0.3726780116558075 | 0.1666666716337204 |
| 6 | 0.3333333432674408 | 0.7453560233116150 | −0.1490712016820908 | −0.3333333432674408 |
| 7 | −0.1666666716337204 | −0.3726780116558075 | 0.0745356008410454 | 0.1666666716337204 |
| 8 | 0.0000000000000000 | 0.0000000000000000 | 0.0000000000000000 | 0.0000000000000000 |
| 9 | 0.3333333432674408 | −0.1490712016820908 | 0.7453560233116150 | −0.3333333432674408 |
| 10 | 0.1333333253860474 | 0.2981424033641815 | 0.2981424033641815 | 0.6666666865348816 |
| 11 | −0.0666666626930237 | −0.1490712016820908 | −0.1490712016820908 | −0.3333333432674408 |
| 12 | 0.0000000000000000 | 0.0000000000000000 | 0.0000000000000000 | 0.0000000000000000 |
| 13 | −0.1666666716337204 | 0.0745356008410454 | −0.3726780116558075 | 0.1666666716337204 |
| 14 | −0.0666666626930237 | −0.1490712016820908 | −0.1490712016820908 | −0.3333333432674408 |
| 15 | 0.0333333313465118 | 0.0745356008410454 | 0.0745356008410454 | 0.1666666716337204 |

The inverse filters are obtained via a numerical inversion from the forward overlapping filters.

TABLE 3

Inverse 2D Overlapping CAT Filters

| 1 + 4k | i → | | | |
|---|---|---|---|---|
| ↓ | 0 | 1 | 2 | 3 |
|  | 0.2083333432674408 | −0.0000000069538757 | −0.0000000069538761 | 0.0000000000000001 |
| 1 | 0.4658475220203400 | 0.0000000067193628 | 0.0000000260078288 | −0.0000000000000002 |
| 2 | 0.2083333581686020 | 0.4166667163372040 | 0.0000000149011612 | 0.0000000082784224 |
| 3 | −0.0931694954633713 | −0.1863389909267426 | −0.0000000066640022 | −0.0000000037022230 |
| 4 | 0.4658475220203400 | 0.0000000021659723 | 0.0000000029940725 | −0.0000000000000000 |
| 5 | 1.0416667461395264 | −0.0000000153978661 | −0.0000000094374020 | 0.0000000000000001 |
| 6 | 0.4658474624156952 | 0.9316949248313904 | −0.0000000066640018 | −0.0000000037022230 |
| 7 | −0.2083333134651184 | −0.4166666269302368 | 0.0000000029802323 | 0.0000000016556845 |
| 8 | 0.2083333730697632 | 0.0000000079472855 | 0.4166667163372040 | 0.0000000082784224 |
| 9 | 0.4658474624156952 | −0.0000000066916819 | 0.9316949248313904 | −0.0000000037022232 |
| 10 | 0.2083333134651184 | 0.4166666567325592 | 0.4166666567325592 | 0.8333332538604736 |
| 11 | −0.0931694731116295 | −0.1863389462232590 | −0.1863389760255814 | −0.3726779520511627 |
| 12 | −0.0931695029139519 | −0.0000000066916819 | −0.1863390058279038 | −0.0000000037022232 |
| 13 | −0.2083332985639572 | 0.0000000028560558 | −0.4166666269302368 | 0.0000000016556845 |

TABLE 3-continued

Inverse 2D Overlapping CAT Filters

| 1 + 4k ↓ | i → 0 | 1 | 2 | 3 |
|---|---|---|---|---|
| 14 | −0.0931694880127907 | −0.1863389760255814 | −0.1863389760255814 | −0.3726779520511627 |
| 15 | 0.0416666567325592 | 0.0833333283662796 | 0.0833333209156990 | 0.1666666567325592 |

In using Cellular Automata Transforms to compress data, the redundancy is identified by transforming the data into the CA space. The principal strength of CAT-based compression is the large number of transform bases available. Use is made of CA transform basis functions that maximize the number of transform coefficients with insignificant magnitudes. It may also be desirable to have a transform that always provides a predictable global pattern in the transform coefficients. This predictability can be taken advantage of in optimal bit assignment for the transform coefficients.

CAT permits the selection of transform basis functions that can be adapted to the peculiarities of the data. A principal strength of CA encoding is the parallel and integer-based character of the computational process involved in evolving states of the cellular automata. This can translate into an enormous computational speed in a well-designed CAT-based encoder.

Apart from the compression of data, CAT also provides excellent tools for performing numerous data processing chores, such as digital image processing (e.g., image segmentation, edge detection, image enhancement) and data encryption.

Figure 9:
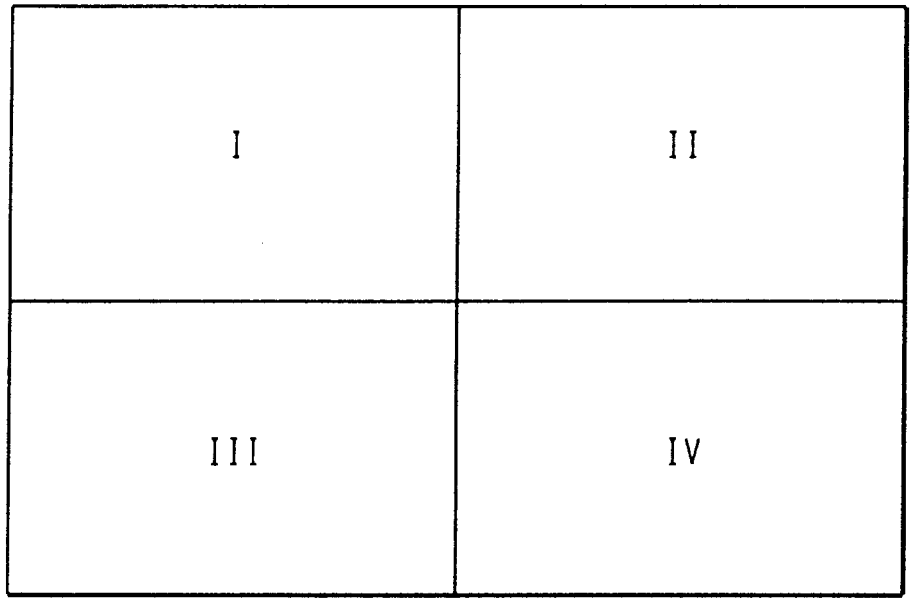
FIG. 9 illustrates decomposition of CAT transform coefficients into 4 bands, according to a preferred embodiment of the present invention.

Digital image compression using sub-band coding will now be described in detail. Accordingly, it is assumed in the following that the CAT filters are of the sub-band type. The analysis holds for both overlapping and non-overlapping filters. Let $w=2^n$ be the width (the number of pixels) of the image while $h=2^m$ be the height, where m,n are integers. Dimensions that are not integral powers of two are handled by the usual zero-padding method. The transform coefficients $c_{kl}$ fall into four distinct classes, as illustrated by FIG. 9. Those at even k and l locations (Group I) represent the "low frequency" components. These are sorted to form a new image of size $2^{(n-1)}2^{(m-1)}$ (at a lower resolution). The remaining transform coefficients(Group II: k even, l odd; Group III: k odd, l even; Group IV: k odd, l odd) are "high frequency" components.

Figure 10:
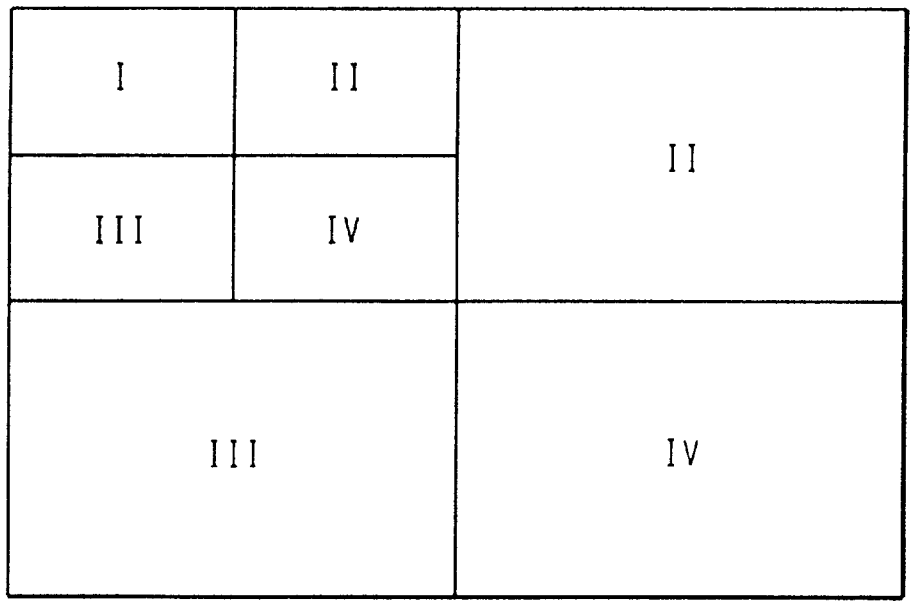
FIG. 10 illustrates the image formed by the Group I components of FIG. 9, as further CAT decomposed and sorted into another 4 groups at a lower resolution.
Figure 11:
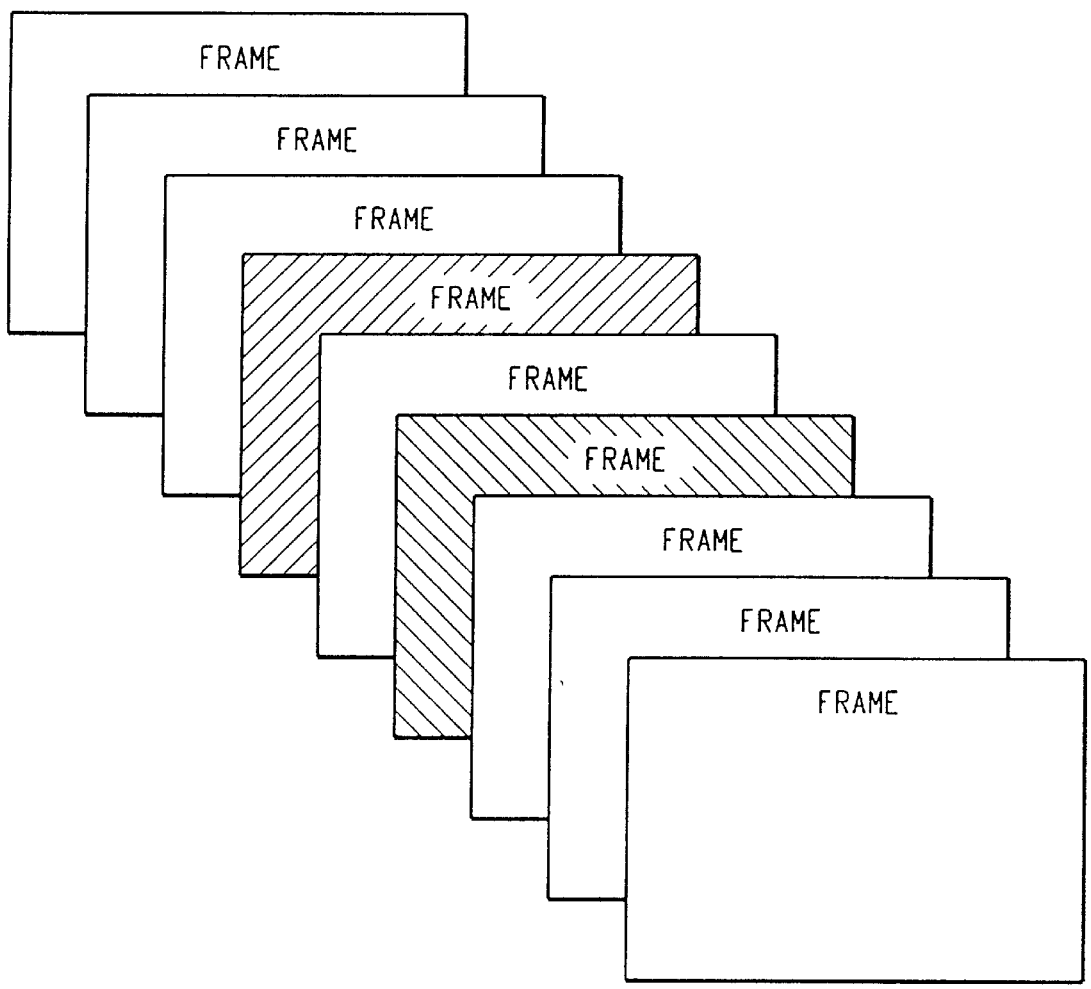
FIG. 11 illustrates video data as a three-dimensional data block of two-dimensional "frames" flowing through time.
Figure 12:
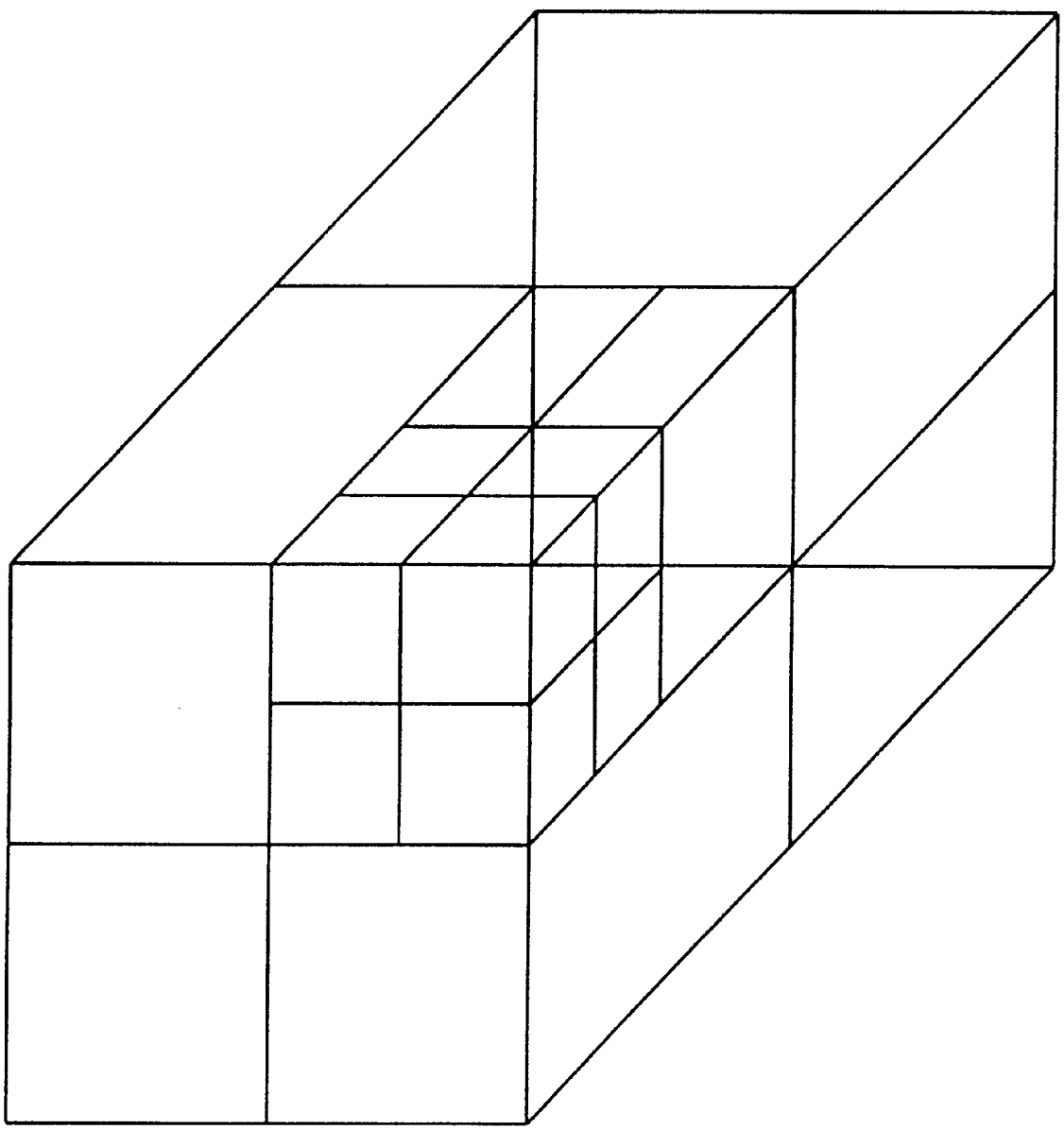
FIG. 12 illustrates sub-bands in a 3D hierarchical CA transform, wherein each resolution level has 8 bands.

The low frequency, Group I, components can be further transformed. The ensuing transform coefficients are again subdivided into 4 groups, as illustrated by FIG. 10. Those in Groups II, III, and IV are stored while Group I is further CAT-decomposed and sorted into another 4 groups at the lower resolution. For an image whose size is an integral power of 2, the hierarchical transformation can continue until Group I contains only one-quarter of the filter size. In general the sub-band coding will be limited to $n_R$ levels. FIG. 9 represents the transform data at the finest resolution. The last transformation, at the $n_R$-th level is the coarsest resolution.

A picture (single frame) compression scheme according to a preferred embodiment will now be described in detail. The nature of the transform coefficients derived from a sub-band CAT coder makes it possible to impose objective conditions based on either: 1) a target compression ratio; or 2) a target error bound. The beauty of an orthonormal transform (orthogonality with $\lambda_k=1$)is that the error in the reconstructed data is equal to the maximum discrepancy in the transform coefficients. The encoding philosophy for a sub-band coder is intricately tied to the cascade of transform coefficient Groups I, II, III, and IV shown in FIGS. 9 and 10. The coding scheme is hierarchical. Bands at the coarsest levels typically contain transform coefficients with the largest magnitudes. Therefore, the coding scheme gives the highest priority to bands with the largest transform coefficient magnitudes.

All the coding schemes make use of a 3-symbol alphabet system: 0 (YES), 1 (NO or POSV); and 2 (NEGV). If a target compression ratio $C_R$ is desired, the steps involved in the scheme are as follows:

1. Calculate the TargetSize=$C_R$. OriginalFileSize;
2. Determine $T_{max}$=magnitude of transform coefficient with the largest value throughout all the bands;
3. Set Threshold=$2^n$>$T_{max}$, where n is an integer;
4. Output n. The decoder requires this number;
5. Set OutputSize=0;
6. Perform Steps i, ii, and iii while OutputSize<TargetSize
   i. For each of the sets of data belonging to Groups I, II, III, and IV, march from the coarsest sub-band to the finest. Determine $T_b$=maximum transform coefficient in each sub-band;
   ii. If $T_b$<Threshold encode YES and move onto the next sub-band;
   Otherwise encode NO and proceed to check each transform coefficient in the sub-band.
      a) If the transform coefficient value is less than Threshold encode YES;
      b) Otherwise encode POSV if transform coefficient is positive or NEGV if it is not.
      c) Decrease the magnitude of the transform coefficient by Threshold.
   iii. Set Threshold to Threshold/2.

It should be understood that the decoding steps for this type of an embedded scheme are implemented by generally following the natural order of the encoding process. In this regard, decoding proceeds generally follows:

1. Read n. Calculate Threshold=$2^n$. Calculate TargetSize=$C_R$.OriginalFileSize
2. Set InputSize=0. Initialize all transform coefficients to zero.
3. Perform steps i, ii, iii while InputSize<TargetSize
   i. March through the sub-bands from the coarsest to the finest.
   ii. Read CODE. If CODE=YES, move onto the next sub-band.
   Otherwise proceed to decode each coefficient in the sub-band:
      a. Read CODE
      b. If CODE=POSV, add Threshold to the coefficient
      c. If CODE=NEGV, subtract Threshold from the coefficient iii. Set Threshold to Threshold/2. Return to step (i) if InputSize<TargetSize.

If a target error $E_{max}$ is the goal, the steps involved in the scheme are as follows:

1. Determine $T_{max}$=magnitude of transform coefficient with the largest value throughout all the bands;
2. Set Threshold=$2^n$>$T_{max}$, where n is an integer;
3. Output n. The decoder requires this number;
4. Perform Steps i, ii, and iii while Threshold>$E_{max}$;
    i. For each of the sets of data belonging to Groups 1, II, III, and IV, march from the coarsest sub-band to the finest. Determine $T_b$=maximum transform coefficient in each sub-band;
    ii. If $T_b$<Threshold encode YES and move onto the next sub-band;
    Otherwise encode NO, and proceed to check each transform coefficient in the sub-band.
        a) If the transform coefficient value is less than Threshold encode YES;
        b) Otherwise encode POSV if transform coefficient is positive or NEGV if it is not.
        c) Decrease the magnitude of the transform coefficient by Threshold.
    iii. Set Threshold to Threshold/2.

Decoding for the "compression error" encoding scheme generally proceeds as follows:

1. Read n, Calculate Threshold=$2^n$
2. Initialize all transform coefficients to zero.
    Perform steps i, ii, iii while Threshold>$E_{max}$
    i. March through sub-bands from the coarsest to the finest.
    ii. Read CODE. If CODE=YES, move onto the next sub-band;
    otherwise proceed to decode each coefficient in the sub-band:
        a. Read CODE
        b. If CODE=POSV, add Threshold to the coefficient
        c. If CODE=NEGV, subtract Threshold from the coefficient
    iii. Set Threshold to Threshold/2.

Symbol Packing Strategy and Entropy Coding will now be described in detail. As the symbols YES, NO, POSV, NEGV are written, they are packed into a byte derived from a 5-letter base-3 word. The maximum value of the byte is 242, which is equivalent to a string of five NEGV. The above encoding schemes tend to produce long runs of zeros. The ensuing bytes can be encoded using any entropy method (e.g., Arithmetic Code, Huffman, Dictionary-based Codes). Otherwise, the packed bytes can be run-length coded and then the ensuing data is further entropy encoded using a dual-coefficient special 16-bit Huffman Code.

In color images, the data f is a vector of three components representing the primary colors such as RED (R), GREEN (G), and BLUE (B). Each of the colors can have any value between 0 and $2^b-1$, where b is the number of bits per pixel. Each color component is treated the same way a grayscale data is processed. It is most convenient to work with the YIQ model, the standard for color television transmission. The Y-component stands for the liuminance of the display, while the I- and Q-components denote chrominance. The luminance is derived from the RGB model using $$Y=0.299R+0.587G+0.114B \tag{16}$$

The chrominance components are computed from:

$$I=0.596R-0.275G-0.321B \tag{17}$$

$$Q=0.212R-0.523G+0.311B \tag{18}$$

The advantage of the YIQ-model is the freedom to encode the components using different degrees of fidelity. The luminance represents the magnitude of light being deciphered by the human eye. The I- and Q-components represent the color information. When the attainment of large compression ratios is a major goal, the chrominance components can be encoded with a much lower degree of fidelity than the luminance portion.

In accordance with a CAT video cube encoding strategy, three-dimensional CAT filters are used. In this regard, video data is treated as a three-dimensional information. Each pixel data at the point (ij) and at a given time t can be represented by:

$$f(i,j,t) = \sum_{k=0}^{N_k-1} \sum_{l=0}^{N_l-1} \sum_{m=0}^{N_m-1} c_{klm} A_{ijtklm} \tag{19a}$$

where f(i, j, t) represents the intensity of a pixel, $c_{klm}$ are the transform coefficients (i.e., weights), $A_{ijtklm}$ are the cellular automata (CA) transform bases and $N_{(.)}$ is the filter size in the respective directions. For instance, $N_k$ is the filter size in the k-direction. Likewise, $$c_{klm} = \sum_{i=0}^{N_k-1} \sum_{j=0}^{N_l-1} \sum_{t=0}^{N_m-1} f_{ijt} B_{ijtklm} \tag{19b}$$

It should be appreciated that the transform bases $A_{ijtklm}$ (i.e., building blocks) can be generated in a variety of ways, including:

(i) Two-dimensional cellular automata evolved over a specified time. In this approach the transform bases $$A_{ijktklm}=F(a_{ijt}a_{klm})$$

where a are the states of the CA as they are evolved over time while F is a mapping function applied as in Classes I and II Schemes described earlier.

(ii) Products of orthogonal two-dimensional (2D, e.g., as used for images) and one-dimensional (1D) CAT filters. In this case:

$$A_{ijtklm}=A''_{ijkl}A'_{tm}$$

where A" are 2D transform basis functions, while A' are 1D transform basis functions. In this case the 2D and 1D transform basis functions are derived from a 1D CAT.

(iii) Products of orthogonal 1D CAT filters:

$$A_{ijtklm}=A'_{ik}A'_{jl}A'_{tm}$$

The steps involved in the "Video Cube" encoding approach are:

(a) Choose the filter size $N_{(.)}$ in the respective directions. In general, we will choose $N_k=N_l=N_m=N$. It should be understood that, in some cases, one or more of the filter sizes may be different from the others. Each "cube" or "block" has a plurality of frames, where N is a measurement of the size of each "cube" or "block."

(b) Select $N_m$ frames. $N_m$ refers to the number of frames selected to be compressed together.

(c) Break each frame into $N_k \times N_l$ rectangles.

(d) Take each data block ($N_k \times N_l \times N_m$) in sequence. Implement 3D CAT transform of each block (Equation 19b). Perform embedded stream encoding to encode the transform coefficients derived by Equation 19b. In the 3D case there are 8 bands (cf 4 bands in 2D) at each resolution level. The coding scheme is also hierarchical. Bands at the coarsest levels will contain the largest transform coefficients. The coding scheme makes use of the 3-symbol alphabet system: 0 (YES), 1 (NO or POS); and 2 (NEGV).

If a target compression ratio $C_R$ is desired, the steps involved in the scheme are as follows:

(a) Calculate the TargetSize=$C_R N_k N_l N_m$;

(b) Determine $T_{max}$=magnitude of transform coefficient with the largest value throughout all the bands;

(c) Set Threshold=$2^n > T_{max}$, where n is an integer;

(d) Output n. The decoder requires this number;

(e) Set OutputSize=0;

Perform the following steps (i), (ii), and (iii), while OutputSize<TargetSize:

(i) For each of the sets of data belonging to the 8 Groups, march from the coarsest sub-band to the finest. Determine $T_b$=maximum transform coefficient in each sub-band;

(ii) If $T_b$<Threshold encode YES and move onto the next sub-band;

Otherwise encode NO and proceed to check each transform coefficient in the sub-band.

(a) If the transform coefficient value is less than Threshold encode YES;

(b) Otherwise encode POSV if transform coefficient is positive or NEGV if it is not.

(c) Decrease the magnitude of the transform coefficient by Threshold.

(iii) Set Threshold to Threshold/2.

If a target error $E_{max}$ is the goal, the steps involved in the scheme are as follows:

(a) Determine $T_{max}$=magnitude of transform coefficient with the largest value throughout all the bands;

(b) Set Threshold=$2^n > T_{max}$, where n is an integer;

(c) Output n. The decoder requires this number;

(d) Perform the following steps (i), (ii) and (iii), while Threshold>$E_{max}$:

(i) For each of the sets of data belonging to the 8 Groups march from the coarsest sub-band to the finest. Determine $T_b$=maximum transform coefficient in each sub-band;

(ii) If $T_b$<Threshold encode YES and move onto the next sub-band;

Otherwise encode NO and proceed to check each transform coefficient in the sub-band.

(a) If the transform coefficient value is less than Threshold encode YES;

(b) Otherwise encode POSV if transform coefficient is positive or NEGV if it is not.

(c) Decrease the magnitude of the transform coefficient by Threshold.

(iii) Set Threshold to Threshold/2.

Decoding proceeds generally in the same manner as described above.

The same symbol packing strategy described earlier is used to better store/transmit the decision symbols. The 3D viewpoint has the advantage that the transform process automatically captures all redundancies in the data in time and within the frame. The tasks of transforming the video cubes can also be carried out in parallel on a multi-processor machine. Such an approach permits real-time video transmission over a restricted bandwidth channel.

Figure 13:
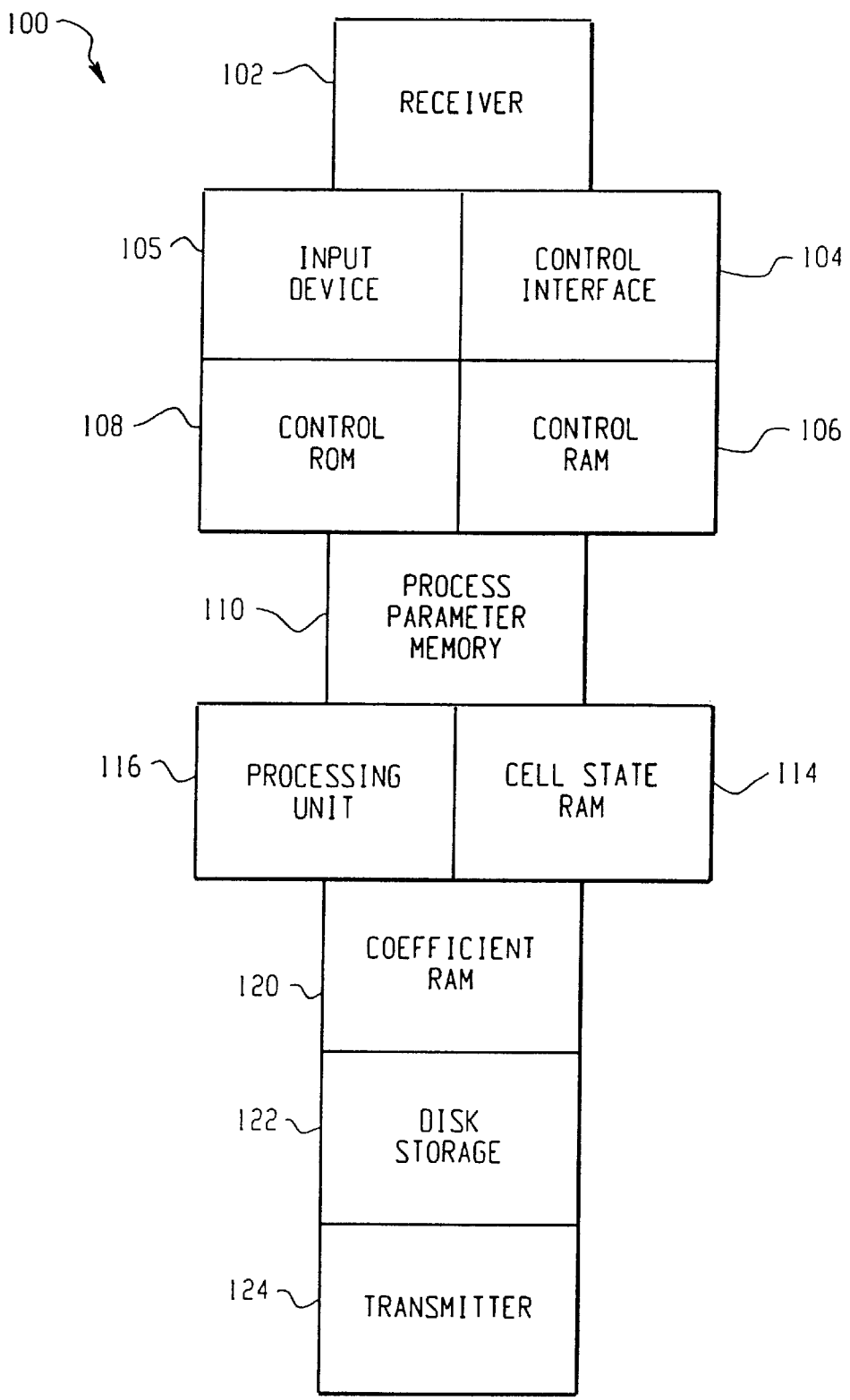
FIG. 13 is a block diagram of an apparatus according to a preferred embodiment of the present invention.

FIG. 13 is a block diagram of an apparatus 100, according to a preferred embodiment of the present invention. It should be appreciated that other apparatus types, such as a general purpose computers, may be used to implement a dynamical system.

Apparatus 100 is comprised of a receiver 102, an input device 105, a programmed control interface 104, control read only memory ("ROM") 108, control random access memory ("RAM") 106, process parameter memory 110, processing unit (PU)116, cell state RAM 114, coefficient RAM 120, disk storage 122, and transmitter 124. Receiver 102 receives image data from a transmitting data source for real-time (or batch) processing of information. Alternatively, image data awaiting processing by the present invention (e.g., archived images) are stored in disk storage 122.

The present invention performs information processing according to programmed control instructions stored in control ROM 108 and/or control RAM 106. Information processing steps that are not fully specified by instructions loaded into control ROM 108 may be dynamically specified by a user using an input device 105 such as a keyboard. In place of, or in order to supplement direct user control of programmed control instructions, a programmed control interface 104 provides a means to load additional instructions into control RAM 106. Process parameters received from input device 105 and programmed control interface 104 that are needed for the execution of the programmed control instructions are stored in process parameter memory 110. In addition, rule set parameters needed to evolve the dynamical system and any default process parameters can be preloaded into process parameter memory 110. Transmitter 124 provides a means to transmit the results of computations performed by apparatus 100 and process parameters used during computation.

The preferred apparatus 100 includes at least one module 112 comprising a processing unit (PU) 116 and a cell state RAM 114. Module 112 is a physical manifestation of the CA cell. In an alternate embodiment more than one cell state RAM may share a PU.

The apparatus 100 shown in FIG. 13 can be readily implemented in parallel processing computer architectures. In a parallel processing implementation, processing units and cell state RAM pairs, or clusters of processing units and cell state RAMs, are distributed to individual processors in a distributed memory multiprocessor parallel architecture.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A method of compressing video data comprising:

determining a multi-state dynamical rule set and an associated transform basis function, of a dynamical system;

receiving input video data; and performing a forward transform using the transform basis function to obtain transform coefficients suitable for reconstructing the input video data, wherein the rule of evolution of the dynamical system, having a neighborhood of m cells and a radius r, is defined by using a vector of integers $W_j$ ($j=0,1,2,3,\ldots,2^m$) such that the state of cell $$a_{(r)(t+1)} = \left( \sum_{j=0}^{2^m-2} W_j \alpha_j + W_{2^m-1} \right)^{W_{2^m}} \mod K$$

where $0 \leq W_j < K$,
and $\alpha_j$ are permutations and products of states of the m cells in the neighborhood.

2. A method according to claim 1, wherein said step of determining the dynamical rule set includes selecting for the dynamical system at least one of: lattice size N, a neighborhood size m, a maximum state K, and boundary conditions BC.

3. A method according to claim 1, wherein said method further comprises quantizing said transform coefficients.

4. A method according to claim 3, wherein said step of quantizing uses a psycho-visual model.

5. A method according to claim 1, wherein said step method further comprises encoding said transform coefficients in accordance with at least one of: embedded band-based threshold coding, bit packing, run length coding, and special dual-coefficient Huffman coding.

6. A method according to claim 1, wherein said transform coefficients are quantized in accordance with a psycho-visual model.

7. A method according to claim 1, wherein said method further comprises the step of transmitting said transform coefficients.

8. A method according to claim 1, wherein said method further comprises the step of storing said transform coefficients.

9. A method according to claim 1, wherein said step of performing a forward transform includes applying said transform basis function to said input video data in an overlapping manner.

10. A method according to claim 1, wherein said step of performing a forward transform includes applying said transform basis function to said input video data in a non-overlapping manner.

11. A method according to claim 1, wherein said multi-state dynamical system is cellular automata.

12. A method according to claim 1, wherein said method further comprises:
receiving said transform coefficients; and
performing an inverse transform using said transform basis function to reconstruct said input video data.

13. A method according to claim 12, wherein said method further comprises:
decoding said transform coefficients in accordance with at least one of:
embedded band-based threshold decoding, bit packing, run length decoding, and special dual-coefficient Huffman decoding, prior to performing said inverse transform.

14. A method according to claim 12, wherein said step of performing said inverse transform includes performing a sub-band inverse transform.

15. A method according to claim 12, wherein said method further comprises at least one of:
storing and transmitting said reconstructed input video data.

16. A method according to claim 12, wherein said step of performing said inverse transform includes applying said transform basis function in an overlapping manner.

17. A method according to claim 12, wherein said step of performing said inverse transform includes applying said transform basis function in a non-overlapping manner.

18. An apparatus for compressing video data comprising:
means for determining a multi-state dynamical rule set and an associated transform basis function of a dynamical system;
means for receiving input video data; and
means for performing a forward transform using the transform basis function to obtain transform coefficients suitable for reconstructing the input video data,
wherein the rule of evolution of a cellular automaton, having a neighborhood of m cells and a radius r, is defined by using a vector of integers $W_j$ ($j=0,1,2,3,\ldots,2^m$) such that the state of cell $$a_{(r)(t+1)} = \left( \sum_{j=0}^{2^m-2} W_j \alpha_j + W_{2^m-1} \right)^{W_{2^m}} \mod K$$

where $0 \leq W_j < K$,
and $\alpha_j$ are permutations and products of states of the m cells in the neighborhood.

19. An apparatus according to claim 18, wherein said means for determining the dynamical rule set includes means for selecting for the dynamical system at least one of: lattice size N, a neighborhood size m, a maximum state K, boundary conditions BC.

20. An apparatus according to claim 18, wherein said apparatus further comprises means for quantizing said transform coefficients.

21. An apparatus according to claim 18, wherein said means for quantizing uses a psycho-visual model.

22. A apparatus according to claim 18, wherein said apparatus further comprises means for encoding said transform coefficients in accordance with at least one of: embedded band-based threshold coding, bit packing, run length coding, and special dual-coefficient Huffman coding.

23. An apparatus according to claim 18, wherein said transform coefficients are quantized in accordance with a psycho-visual model.

24. An apparatus according to claim 18, wherein said apparatus further comprises means for transmitting said transform coefficients.

25. An apparatus according to claim 18, wherein said apparatus further comprises means for storing said transform coefficients.

26. An apparatus according to claim 18, wherein said means for performing a forward transform includes means for applying said transform basis function to said input video data in an overlapping manner.

27. An apparatus according to claim 18, wherein said means for performing a forward transform includes means for applying said transform basis function to said input video data in a non-overlapping manner.

28. An apparatus according to claim 18, wherein said multi-state dynamical system is cellular automata.

29. An apparatus according to claim 19, wherein said apparatus further comprises:
means for receiving said transform coefficients; and
means for performing an inverse transform using said transform basis function to reconstruct said input video data.

30. An apparatus according to claim 29, wherein said apparatus further comprises:

means for decoding said transform coefficients in accordance with at least one of: embedded band-based threshold decoding, bit packing, run length decoding, and special dual-coefficient Huffman decoding.

31. An apparatus according to claim 29, wherein said means for performing said inverse transform includes means for performing a sub-band inverse transform.

32. An apparatus according to claim 29, wherein said apparatus further comprises at least one of:
means for storing the reconstructed input video data, and means for transmitting said reconstructed input video data.

33. An apparatus according to claim 29, wherein said means for performing said inverse transform includes means for applying said transform basis function in an overlapping manner.

34. An apparatus according to claim 29, wherein said means for performing said inverse transform includes means for applying said transform basis function in a nonoverlapping manner.

35. A method of compressing video data comprising:
receiving a 3-D block of input video data, defined by directions k, l and m, the block of input video data comprised of a plurality of data frames;
determining a transform basis function having a size defined by $N_k$, $N_l$, and $N_m$, wherein said transform basis function is derived from at least one of: (a) a two-dimensional cellular automata evolved over a specified time; (b) a product of orthogonal two-dimensional cellular automata filters and a one-dimensional cellular automata filter; and (c) products of orthogonal one-dimensional cellular automata filters;
selecting $N_m$ data frames to be compressed together;
dividing each data frame into $N_k \times N_l$ rectangles; and
performing a forward transform on a block of data defined by $N_k \times N_l \times N_m$, using the transform basis function, to obtain transform coefficients suitable for reconstructing the input video data.

36. A method according to claim 35, wherein said transform basis function is derived from a two-dimensional cellular automata evolved over a specified time, the elements of the transform basis function is expressed as:

$$A_{ijktklm} = F(a_{ijt} a_{klm})$$

where a are the states of a cellular automata as it is evolved over time and F is a mapping function.

37. A method according to claim 35, wherein said transform basis function is derived from a product of orthogonal two-dimensional cellular automata filters, and a one-dimensional cellular automata filter, the transform basis function is expressed as:

$$A_{ijtklm} = A''_{ijkl} A'_{tm}$$

where A" are two-dimensional transform basis functions, and A' are one-dimensional transform basis functions.

38. A method according to claim 37, wherein the two-dimensional and one-dimensional transform basis functions are derived from a 1D cellular automata transform.

39. A method according to claim 35, wherein said transform basis function is derived from products of orthogonal one-dimensional cellular automata filters, the products of the orthogonal one-dimensional cellular automata filters are expressed as:

$$A_{ijtklm} = A'_{ik} A'_{jl} A'_{tm}.$$

40. An apparatus for compressing video data comprising:
means for receiving a 3-D block of input video data, defined by directions k, l and m, the block of input video data comprised of a plurality of data frames;
means for determining a transform basis function having a size defined by $N_k$, $N_l$, and $N_m$, wherein said transform basis function is derived from at least one of: (a) a two-dimensional cellular automata evolved over a specified time; (b) a product of orthogonal two-dimensional cellular automata filters and a one-dimensional cellular automata filter; and (c) products of orthogonal one-dimensional cellular automata filters;
means for selecting $N_m$ data frames to be compressed together;
means for dividing each data frame into $N_k \times N_l$ rectangles; and
means for performing a forward transform on a block of data defined by $N_k \times N_l \times N_m$, using the transform basis function, to obtain transform coefficients suitable for reconstructing the input video data.

41. An apparatus according to claim 40, wherein said transform basis function is derived from a two-dimensional cellular automata evolved over a specified time, the elements of the transform basis function is expressed as:

$$A_{ijktklm} = F(a_{ijt} a_{klm})$$

where a are the states of a cellular automata as it is evolved over time and F is a mapping function.

42. An apparatus according to claim 40, wherein said transform basis function is derived from a product of orthogonal two-dimensional cellular automata filters, and a one-dimensional cellular automata filter, the transform basis function is expressed as:

$$A_{ijtklm} = A''_{ijkl} A'_{tm}$$

where A" are two-dimensional transform basis functions, and A' are one-dimensional transform basis functions.

43. An apparatus according to claim 42, wherein the two-dimensional and one-dimensional transform basis functions are derived from a 1D cellular automata transform.

44. An apparatus according to claim 40, wherein said transform basis function is derived from products of orthogonal one-dimensional cellular automata filters, the products of the orthogonal one-dimensional cellular automata filters are expressed as:

$$A_{ijtklm} = A'_{ik} A'_{jl} A'_{tm}.$$

45. A method of embedded band-based threshold coding for sub-band encoded transform coefficients, comprising:
determining a TargetSize equal to a target compression ratio $C_R \cdot N_k N_l N_m$, where $N_k$, $N_l$ and $N_m$ are respective transform basis function sizes in k, l and m directions;
determining a magnitude of the transform coefficient with the largest value throughout all the sub-bands ($T_{max}$);
establishing a Threshold=$2^n > T_{max}$, where n is an integer;
setting OutputSize=0, and performing steps (a), (b) and (c) while OutputSize<TargetSize:
(a) For each set of data belonging to all the bands, marching from the coarsest sub-band to the finest, and determining the maximum transform coefficient ($T_b$) in each sub-band;
(b) if $T_b$<Threshold encoding YES and move onto the next sub-band, otherwise encoding NO and proceeding to check each transform coefficient in the sub-band, wherein (1) if the transform coefficient value is less than Threshold encoding YES, otherwise encoding POSV if transform coefficient is positive or NEGV if it is not, and (2) decreasing the magnitude of the transform coefficient by Threshold; and (c) setting Threshold to Threshold/2, and returning to step (a) if OutputSize<TargetSize.

46. A method of embedded band-based threshold coding for sub-band encoded transform coefficients, comprising:

determining a magnitude of the transform coefficient with the largest value throughout all the sub-bands ($T_{max}$);

establishing a Threshold=$2^n$>$T_{max}$, where n is an integer;

performing steps (a), (b) and (c) while Threshold>$E_{max}$, wherein $E_{max}$ is a predetermined target error:

(a) for each of the sets of data belonging to all of the bands, marching from the coarsest sub-band to the finest, and determining the maximum transform coefficient ($T_b$) in each sub-band;

(b) if $T_b$<Threshold encoding YES and move onto the next sub-band, otherwise encoding NO and proceeding to check each transform coefficient in the sub-band, wherein (1) if the transform coefficient value is less than Threshold encoding YES, otherwise encoding POSV if transform coefficient is positive or NEGV if it is not, and (2) decreasing the magnitude of the transform coefficient by Threshold; and (c) setting Threshold to Threshold/2, and returning to step (a) if Threshold>$E_{max}$.

* * * * *